United States Patent
Suntharalingam

(10) Patent No.: US 10,352,729 B2
(45) Date of Patent: Jul. 16, 2019

(54) SYSTEM AND METHOD FOR USING ACTUATOR COIL INDUCTANCE TO DIAGNOSE STUCK DIFFERENTIAL

(71) Applicant: GM Global Technology Operations LLC, Detroit, MI (US)

(72) Inventor: Piranavan Suntharalingam, Scarborough (CA)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 312 days.

(21) Appl. No.: 15/421,988

(22) Filed: Feb. 1, 2017

(65) Prior Publication Data

US 2018/0216966 A1    Aug. 2, 2018

(51) Int. Cl.
   *F16H 48/34*    (2012.01)
   *G01D 5/20*    (2006.01)
   *F16H 48/20*    (2012.01)

(52) U.S. Cl.
   CPC .............. *G01D 5/20* (2013.01); *F16H 48/20* (2013.01); *F16H 48/34* (2013.01); *F16H 2048/204* (2013.01); *F16H 2048/346* (2013.01)

(58) Field of Classification Search
   CPC .............. F16H 48/34; F16H 2048/346; F16H 2048/204; G01D 5/20
   See application file for complete search history.

(56) References Cited

U.S. PATENT DOCUMENTS

| | | | | |
|---|---|---|---|---|
| 7,264,568 B2* | 9/2007 | Ludwig | .................. | F16H 48/08 192/30 W |
| 7,357,749 B2* | 4/2008 | Nofzinger | ............... | F16H 48/08 475/157 |
| 9,976,877 B2* | 5/2018 | Mitzel | .................... | G01D 5/147 |
| 10,036,658 B2* | 7/2018 | Hernandez-Oliver | ....................... | G01D 5/2006 |
| 2008/0103018 A1* | 5/2008 | Peura | ...................... | F16H 48/08 477/35 |
| 2016/0319925 A9* | 11/2016 | Cochren | ................. | F16H 48/34 |

* cited by examiner

*Primary Examiner* — Sherry L Estremsky

(57) ABSTRACT

A system is disclosed for detecting when an electronic locking (e-Locker) differential of a vehicle is in a stuck condition. The system may have an e-Locker differential for driving a plurality of wheels, and may be configured to move between first and second positions, one of which places the e-Locker differential in a locked state, and the other of which places it in an unlocked state. An e-Locker coil, when energized may cause movement of the differential e-Locker actuator between the first and second positions. A position sensing subsystem may use an inductance of the e-Locker coil to determine if the differential e-Locker actuator is stuck in one of the first and second positions.

14 Claims, 3 Drawing Sheets

SYSTEM AND METHOD FOR USING ACTUATOR COIL INDUCTANCE TO DIAGNOSE STUCK DIFFERENTIAL

FIELD

The present disclosure relates to differentials used with motor vehicles, and more particularly to a system for measuring an inductance associated with an electronically lockable differential to detect when the electronically lockable differential is stuck in a locked condition.

BACKGROUND

The background description provided here is for the purpose of generally presenting the context of the disclosure. Work of the presently named inventor, to the extent it is described in this background section, as well as aspects of the description that may not otherwise qualify as prior art at the time of filing, are neither expressly nor impliedly admitted as prior art against the present disclosure.

An electronically lockable differential may be referred to as an "e-Locker". The e-Locker increases the traction capability of a vehicle when the vehicle is being driven off-road over uneven. Rock climbing is a particular example of off-road driving where an e-Locker is helpful.

However, when the vehicle is driven on the road, the vehicle's differential should not be locked. Locking the differential when driving on paved roads may disable safety critical systems of the vehicle such as an antilock braking system (ABS) and electronic stability control (ESC). Operating a vehicle on paved roads with the differential locked may also adversely affect the steering of the vehicle.

An e-Locker may include a solenoid coil which moves a linear actuator to lock the differential gear set in the drive axle. A spring may be attached with the actuator so that when the coil is de-energized, the actuator returns to its disengaged position, and thus place the e-Locker in its disengaged state. However, under certain circumstances the spring force may not be sufficient to overcome the friction exerted by the differential locker. When the driver begins a lane change maneuver or a turn on a paved dry road, the vehicle may behave differently if the e-Locker is still engaged. This is because with the e-Locker engaged, the axles associated with both of the driven wheels will be forced to turn at the same speed. While changing lanes or making a turn, the outside wheel needs to rotate faster than the inside wheel. Therefore, it is important for the status of the e-Locker to be known to the vehicle's controller so that the controller can take the appropriate control action.

It is difficult to determine when the e-Locker is stuck because of the difficulty in incorporating a position sensor inside the differential locker assembly. Differential wheel speed and steering angle information are often used to determine if the actuator of the e-Locker actuator is stuck. Therefore, the vehicle typically has to go through a few maneuvers before the ECU is able to diagnose the status of the e-Locker.

SUMMARY

In one aspect of the present disclosure relates to a system for detecting when an electronic locking (e-Locker) differential of a vehicle is in a stuck condition. The system may comprise an e-Locker differential for driving a plurality of wheels of the vehicle. The e-Locker differential actuator may be configured to move between first and second positions, wherein one of the first and second positions may place the e-Locker differential in a locked state, and the other of the first and second positions may place the e-Locker differential in an unlocked state. An e-Locker coil may be operably associated with the differential e-Locker actuator for causing movement of the differential e-Locker actuator between the first and second positions depending on whether the e-Locker coil is energized. A position sensing subsystem may be configured to use an inductance of the e-Locker coil to determine if the differential e-Locker actuator is stuck in one of the first and second positions when it has been commanded to be in the other one of the first and second positions.

In another aspect the present disclosure relates to a system for detecting when an electronic locking (e-Locker) differential of a vehicle is in a stuck condition. The system may comprise an e-Locker differential for driving a plurality of wheels of the vehicle. A differential e-Locker actuator may be configured to move between first and second positions, wherein one of the first and second positions may place the e-Locker differential in a locked state, and the other of the first and second positions may place the e-Locker differential in an unlocked state. An e-Locker coil may be operably associated with the differential e-Locker actuator for causing movement of the differential e-Locker actuator between the first and second positions depending on whether the e-Locker coil is energized. The e-Locker coil may have a first inductance when the differential e-Locker actuator is in the first position and a second inductance when the differential e-Locker actuator is in the second position. An inductance measuring circuit may be incorporated for measuring the inductance of the e-Locker coil. A diagnostic subsystem may use the measured inductance to determine if the differential e-Locker actuator is stuck in a position that differs from a commanded position, and to generate an output signal that indicates when the differential e-Locker actuator is not in the commanded position.

In still another aspect the present disclosure relates to a system for detecting when an electronic locking (e-Locker) differential of a vehicle is in a stuck condition. The system may comprise an e-Locker differential for driving a plurality of wheels of the vehicle and a differential e-Locker actuator configured to move between first and second positions. One of the first and second positions may place the e-Locker differential in a locked state and the other of the first and second positions may place the e-Locker differential in an unlocked state. An e-Locker coil may be operably associated with the differential e-Locker actuator for causing movement of the differential e-Locker actuator between the first and second positions depending on whether the e-Locker coil is energized. The e-Locker coil may have a first inductance when the differential e-Locker actuator is in the first position and a second inductance when the differential e-Locker actuator is in the second position. An inductance measuring circuit may be incorporated for measuring the inductance of the e-Locker coil. A diagnostic subsystem may use the measured inductance to determine if the differential e-Locker actuator is stuck in a position that differs from a commanded position, and to generate an output signal that indicates when the differential e-Locker actuator is not in the commanded position. An e-Locker actuator controller may be in communication with the diagnostic subsystem. The differential e-Locker actuator may be used for commanding the differential e-Locker actuator to move between the first and second positions in response to e-Locker engage and disengage commands.

In still another aspect the present disclosure relates to a system for detecting when an electronic locking (e-Locker) differential of a vehicle is in a stuck condition. The system may comprise an e-Locker differential for driving a plurality of wheels of the vehicle. A differential e-Locker actuator may be configured to move between first and second positions, wherein one of the first and second positions may place the e-Locker differential in a locked state, and the other of the first and second positions may place the e-Locker differential in an unlocked state. An e-Locker coil may be operably associated with the differential e-Locker actuator for causing movement of the differential e-Locker actuator between the first and second positions depending on whether the e-Locker coil is energized. The e-Locker coil may have a first inductance when the differential e-Locker actuator is in the first position and a second inductance when the differential e-Locker actuator is in the second position, and a sensor for sensing a position of the differential e-locker actuator. A diagnostic subsystem may be in communication with the sensor for using information provided by the sensor to determine if the differential e-Locker actuator is stuck in a position that differs from a commanded position, and to generate an output signal that indicates when the differential e-Locker actuator is not in the commanded position. The e-Locker actuator controller may be in communication with the diagnostic subsystem and the differential e-Locker actuator for commanding the differential e-Locker actuator to move between the first and second positions in response to e-Locker engage and disengage commands.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

Figure 1:
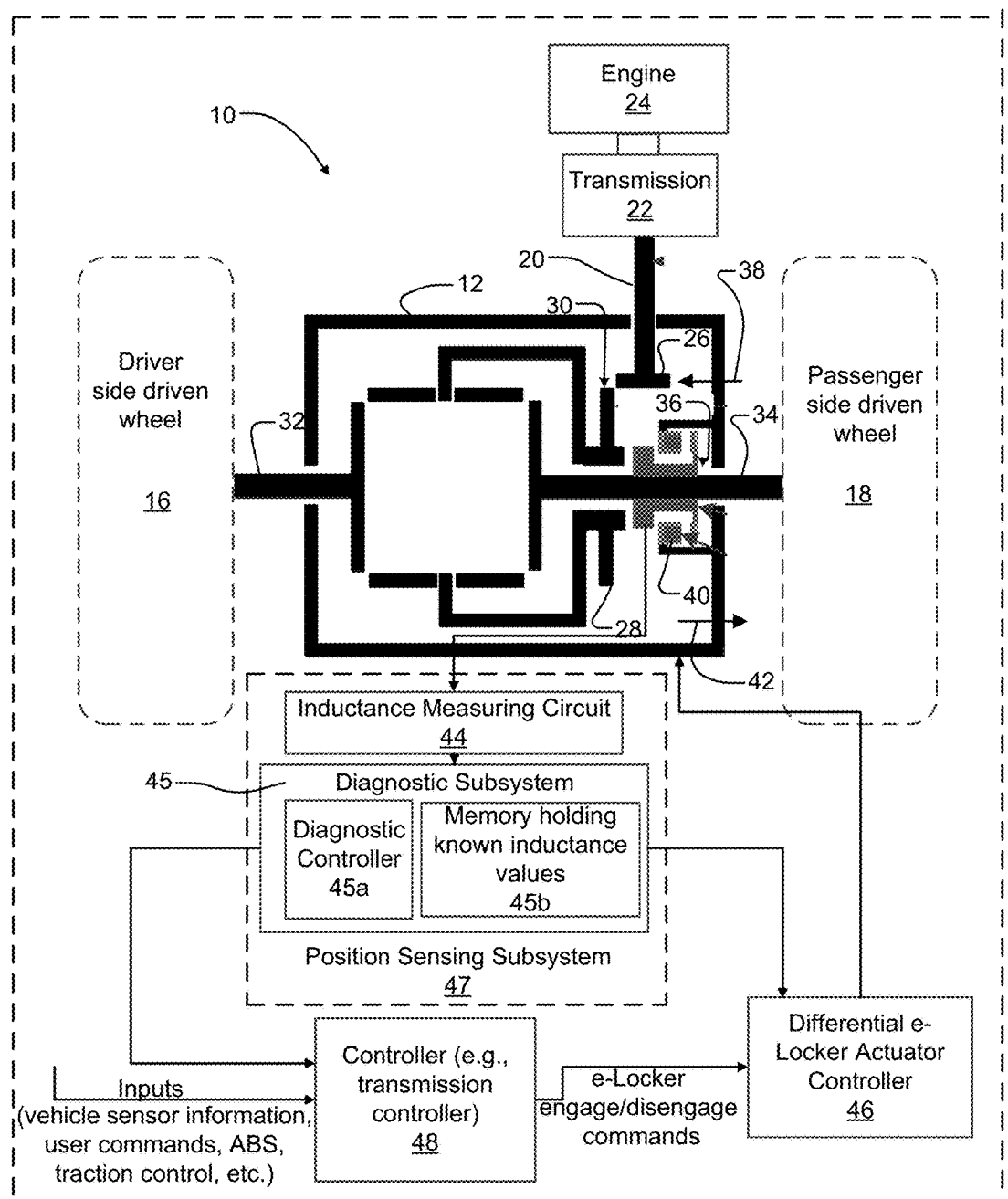
FIG. 1 is a block diagram of one embodiment of the system showing a drivetrain having an e-Locker differential, an actuator coil inductance measuring circuit, and a controller.

FIG. 1 illustrates a system 10 in accordance with one embodiment of the present disclosure for detecting a condition of an e-Locker differential 12 of a motor vehicle 14. In this example the motor vehicle 14 is shown having two driven wheels 16 and 18, although it will be appreciated that the system 10 may be implemented on each one of a pair of differentials of a four wheel drive vehicle. By the term "driven" wheels it is meant the wheels 16 and 18 of the vehicle 14 that directly receive the torque from the e-Locker differential 12 and propel the vehicle along a ground surface. Thus, the wheels 16 and 18 may be the two front wheels of the vehicle 14 or they be the two rear wheels, and the system 10 is equally well suited for use with either configuration. Still further, the system 10 is just as well suited for use in a vehicle with a four wheel drive system or an all-wheel drive system that employs separate front and rear e-Locker differentials.

The e-Locker differential 12 in FIG. 1 has a drive axle 20 which is driven by an output from a transmission 22. The transmission 22 in turn receives an output from an engine 24 of the vehicle 14. The drive axle 20 has a gear 26 which engages a ring gear 28 of a differential drive gear assembly 30. The e-Locker differential 12 drives axles 32 and 34, which in turn drive the driver side driven wheel 16 and the passenger side driven wheel 18, respectively. An e-Locker actuator 36 comprises a solenoid valve having a member that moves linearly in accordance with arrow 38 when an actuator coil 40 is energized and locks the axles 32 and 34. When the e-Locker 12 is in its locked state the axles 32 and 34 are forced to rotate together at the same rotational speed in response to the drive input signal from drive axle 20. De-energizing the actuator coil 40 enables a spring (not shown) to urge the e-Locker actuator 36 back in the direction of arrow 42 to its initial (i.e., unlocked) state. In the unlocked state the driven axles 32 and 34 are free to rotate at different speeds.

The system 10 may further include an inductance measuring circuit 44 for measuring the inductance of the actuator coil 40. The inductance measuring circuit 44 may provide an output to a diagnostic subsystem 45 which detects if the e-Locker actuator 36 is actually in its commanded state. The inductance measuring circuit 44 and the diagnostic subsystem 45 collectively may form a position sensing subsystem 47. The inductance measuring circuit 44 may measure a change in inductance of the coil 40 of the e-Locker actuator 36 when a movable metallic element of the e-Locker actuator changes position, relative to the actuator coil 40, as it moves from a first state (i.e., corresponding to an unlocked state of the e-Locker differential 12) to a second state (corresponding to a locked state of the e-Locker differential). The movement of the metallic element of the e-Locker actuator 36 from the first state to the second state results in a change in the measured inductance of the actuator coil 40 from a first inductance value to a second inductance value.

The diagnostic subsystem 45 may provide an output to a differential e-Locker actuator controller 46 that informs the differential e-Locker actuator controller whether the e-Locker actuator 36 is in the locked state or the unlocked state. The differential e-Locker actuator controller 46 controls actuation and de-actuation of the e-Locker actuator 36 to thus place the e-Locker differential 12 in its locked state or its unlocked state.

The differential e-Locker actuator controller 46 may also be in communication with a controller 48 used on the vehicle. In one example the controller 48 may be a transmission controller housed within the vehicle's transmission. The controller 48 may receive various inputs (not shown) from other sensors of the vehicle such as wheel speed sensors, a steering wheel position sensor, the vehicle's antilock braking system (ABS), the vehicle's electronic stability control system, a driver e-Lock input selector for commanding locking and unlocking of the e-Locker differential 12, etc. The controller 48 may command the differential e-Locker actuator controller 46 to place the e-Locker differential 12 in the locked state or the unlocked state based on receiving one or more of the above mentioned inputs.

The inductance measuring circuit 44 measures the inductance of the actuator coil 40 when the e-Locker actuator 36 is in its locked state and when it is in its unlocked state. Since the e-Locker actuator 36 comprises a solenoid valve style actuator, the inductance of the e-Locker actuator coil changes as the movable member of the solenoid valve moves between its two positions, one placing the e-Locker differential 12 in its locked state and the other placing the e-Locker differential in its unlocked state. In its locked state, the e-Locker actuator 36 will be positioned closest to the actuator coil 40, and thus its inductance will be at a maximum value. In its unlocked state, the e-Locker actuator 36 will be spaced away from the actuator coil 40, and thus the inductance of the e-Locker actuator 36 will be at a minimum level. The measured inductance of the e-Locker actuator 36 may be used by the differential e-Locker actuator controller 46 to verify that the e-Locker actuator is actually in the position that it is commanded to be in.

Figure 3:
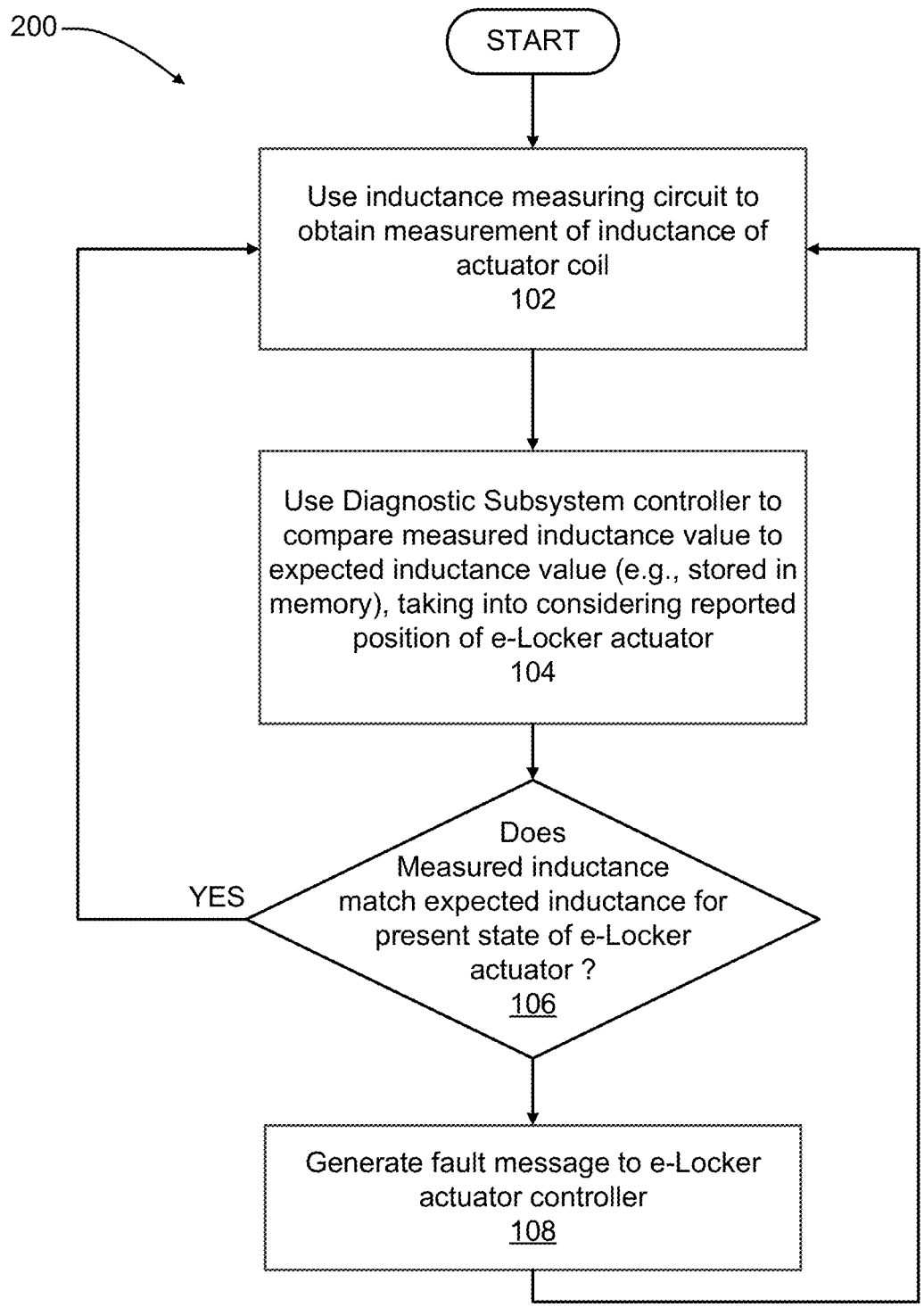
FIG. 3 is a flow chart illustrating various operations that may be performed by the system of FIG. 1 in determining if the e-Locker actuator is stuck in a locked state or an unlocked state.

Referring to FIG. 3 a flow diagram 100 is shown illustrating various operations that may be performed in controlling the e-Locker differential 12 and detecting if the e-Locker actuator 36 is not in the state that it is commanded to be in. Initially the differential e-Locker actuator controller 46 applies a signal on line 50 to the actuator coil 40 to energize the actuator coil, or removes the signal on line 50 to de-energize the actuator coil. The differential e-locker actuator controller 46 may also apply a signal on line 52 to a plurality of external vehicle subsystems 54 (e.g., engine control module, battery system, braking system, etc.), as well as a signal 56 to the diagnostic subsystem 45. The external subsystems 54 may provide signals on line 58 back to the diagnostic subsystem 45. Other various inputs (e.g., wheel speeds, steering wheel position, ABS, traction control, etc.) may also be provided to the diagnostic subsystem 45. The inductance measuring circuit 44 receives a signal on line 59 from the actuator coil 40 which it uses to determine the inductance of the actuator coil, and provides a signal on line 61 indicative of the measured inductance of the actuator coil 40 to the diagnostic subsystem 45.

The diagnostic subsystem 45 determines from its various inputs if the e-Locker actuator 36 is in the position that has been commanded to be in (i.e., in position to lock the e-locker differential 12 or in position to unlock the e-Locker differential) by the differential e-Locker actuator controller 46. If it is detected that the e-Locker actuator 36 is not in the position commanded by the e-Locker actuator controller 46, then the diagnostic system 45 supplies a signal on line 60 to the differential e-Locker actuator controller. The signal on line 60 may be used to inform the differential e-Locker actuator controller 46 that further attempts need to be made to move the e-Locker actuator 36 to the commanded position. Alternatively, the diagnostic subsystem 45 may also supply a signal on line 62 to the controller 48 to inform the controller of the stuck actuator condition. If the stuck actuator condition is corrected, then the diagnostic subsystem 45 may supply a signal on line 60, and optionally on line 62, to inform the differential e-Locker actuator controller 46, and optionally the controller 48, that the e-Locker actuator 36 is now in the correct commanded state.

Figure 2:
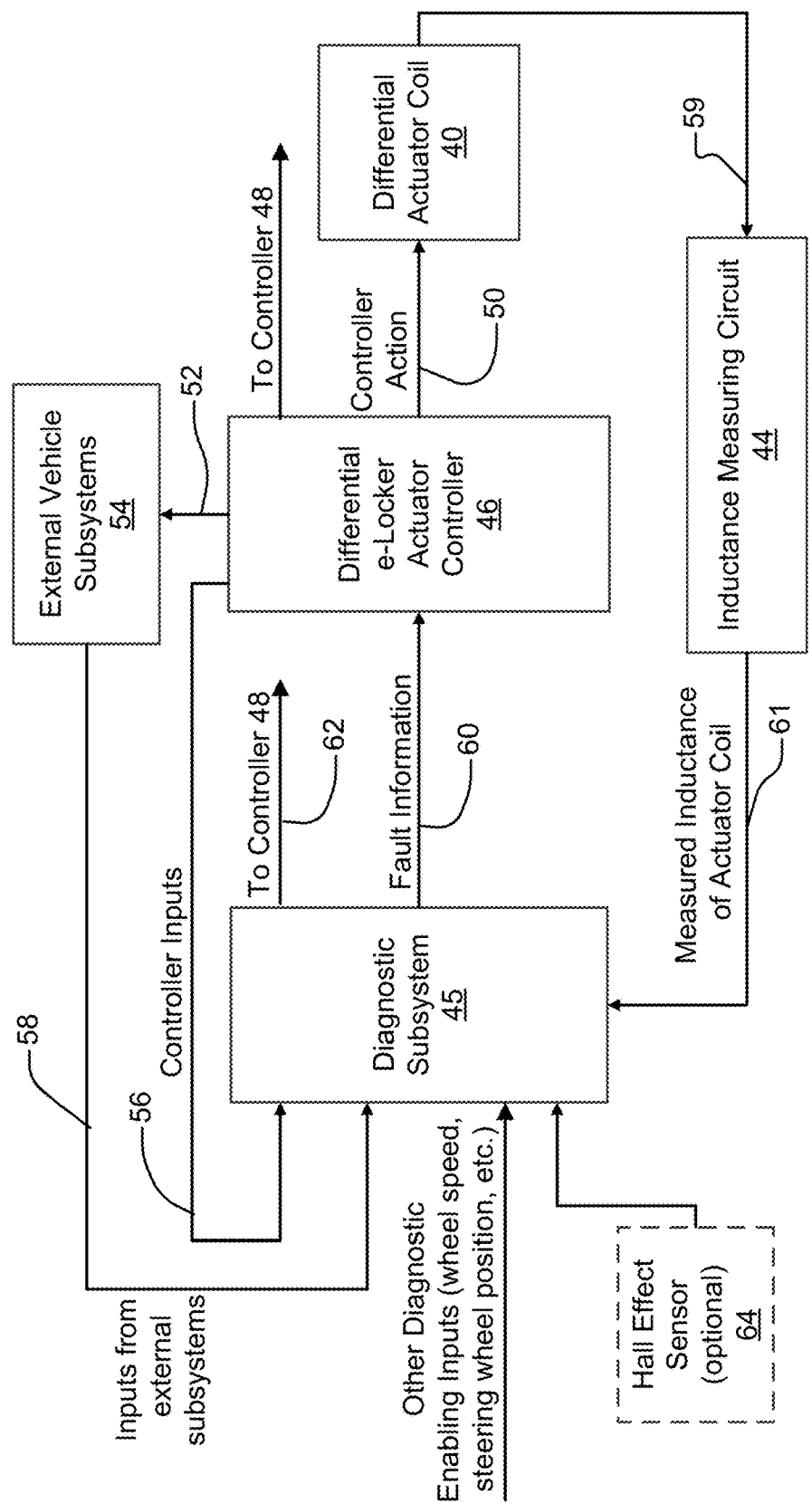
FIG. 2 is a flow control diagram illustrating various operations that may be performed by the system of FIG. 1 in detecting a condition of the e-Locker, and also illustrating an optional Hall Effect sensor that may be used in place of the inductance measuring circuit to provide a signal indicative of a position of an e-Locker actuator coil.

Referring further to FIG. 2, an optional embodiment of the system 10 may employ a suitable sensor, for example a Hall effect sensor 64, located within the e-Locker differential 12 in proximity to the e-locker actuator 36 and the actuator coil 40 to sense the position of the e-Locker actuator 36. If the Hall effect sensor 64 is used it may supply a signal to the diagnostic subsystem 45 and/or the controller 48 to indicate a stuck actuator condition. If the Hall effect sensor 64 is used, then the inductance measuring circuit 44 will not be needed. Referring, to FIG. 3, a flowchart 100 illustrates operations performed by the system 10, and more particularly the position sensing subsystem 47. Initially at operation 102 the inductance measuring circuit 44 is used to make a real time measurement of an inductance of the actuator coil 40. This is reported to the diagnostic subsystem 45 at operation 104, and the controller 45a of the diagnostic subsystem 45 compares the measured inductance value to a known, stored, inductance value, which may be stored in the memory 45b, which represents that particular inductance value that the controller 45 would expect to see in view of the known state of the e-Locker actuator 36 (i.e., either locked state or unlocked state). At operation 106, the controller 45a uses the results of the comparison at operation 104 to make a determination if the measured inductance matches the known stored inductance value, taking into consideration the reported real time state of the e-Locker actuator 36. If the determination at operation 106 produces a "Yes" answer, then the controller 45a concludes that the e-Locker actuator 36 is in fact in the position that it is reported (or commanded) to be in, and operations 102 and 104 are repeated. But if the determination at operation 106 produces a "No" answer, then the controller 45a interprets this to mean that the e-Locker actuator 36 is not in the position that it is reported (or commanded) to be in, and at operation 108 the controller 45a sends a fault signal to the e-Locker actuator controller 46. Optionally, this condition may be reported to the vehicle operator by a message on the vehicle's dashboard, to one or more other controllers of the vehicle, and/or other remediation action taken to attempt to remedy the stuck e-Locker actuator condition. So in this regard it will be appreciated that by making a comparison with known inductance values of the actuator coil 40 that correspond to both locked and unlocked states of the e-Locker actuator 36, the system 10 is able to determine if the e-Locker actuator 36 is stuck in either a locked condition or an unlocked condition.

While the controller 45 has been described as handling the evaluation of the inductance measurement, it will be appreciated that this operation could also be performed by the controller 48, or possibly any other controller operating on the vehicle's communications bus (e.g., Controller Area Network (CAN) bus), and then reported back to the diagnostic subsystem 45. Likewise, a memory independent of the position sensing subsystem 47, for example a memory associated with the controller 48, could be used to store the known inductance values associated with the locked and unlocked states of the e-Locker actuator 36.

Accordingly, the system 10 may be implemented with only minimal modifications to the e-Locker differential 12. If the inductance measuring circuit 44 is used to detect a stuck e-Locker actuator condition, then no additional sensors are required to be positioned within the e-Locker differential 12, which reduces cost and complexity of the overall system 10.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

What is claimed is:

1. A system for detecting when an electronic locking (e-Locker) differential of a vehicle is in a stuck condition, comprising:
an e-Locker differential configured to drive a plurality of wheels of the vehicle;
a differential e-Locker actuator configured to move between first and second positions, wherein one of the first and second positions places the e-Locker differential in a locked state, and the other of the first and second positions places the e-Locker differential in an unlocked state;
an e-Locker coil operably associated with the differential e-Locker actuator configured to move the differential e-Locker actuator between the first and second positions depending on whether the e-Locker coil is energized,
wherein the e-Locker coil has a first inductance when the differential e-Locker actuator is in the first position and has a second inductance when the differential e-Locker actuator is in the second position,
wherein the first inductance is greater than the second inductance;
an inductance measuring circuit for measuring the inductance of the e-Locker coil; and
a diagnostic subsystem configured to, based on the measured inductance of the e-Locker coil, determine if the differential e-Locker actuator is stuck in a position that is not the same as a commanded position, and to generate an output signal that indicates whether the differential e-Locker actuator is stuck in a position that is not the same as the commanded position.

2. The system of claim 1, further comprising a differential e-Locker actuator controller configured to command the differential e-Locker actuator to move between the first and second positions.

3. The system of claim 2, wherein the differential e-Locker actuator controller is in communication with the diagnostic subsystem.

4. The system of claim 3, further comprising a controller in communication with the differential e-Locker actuator controller.

5. The system of claim 1, further comprising an e-Locker controller configured to command the differential e-Locker actuator to move between the first and second positions.

6. The system of claim 1 wherein the diagnostic subsystem is configured to:
determine an expected inductance of the e-Locker coil based on the commanded position; and
determine if the e-Locker actuator is stuck in a position that is not the same as the commanded position based on a comparison of the measured inductance of the e-Locker coil and the expected inductance of the e-Locker coil.

7. A system for detecting when an electronic locking (e-Locker) differential of a vehicle is in a stuck condition, comprising:
an e-Locker differential configured to drive a plurality of wheels of the vehicle;
a differential e-Locker actuator configured to move between first and second positions, wherein the e-Locker differential is in a locked state when the differential e-Locker actuator is in the first position, and the e-Locker differential is in an unlocked state when the differential e-Locker actuator is in the second position;
an e-Locker coil operably associated with the differential e-Locker actuator and configured to move the differential e-Locker actuator between the first and second positions depending on whether the e-Locker coil is energized,
wherein the e-Locker coil has a first inductance with the differential e-Locker actuator is in the first position and has a second inductance when the differential e-Locker actuator is in the second position;
a sensor configured to sense one of (a) a position of the differential e-locker actuator and (b) an inductance of the e-Locker coil;
a diagnostic subsystem configured to, based on input from the sensor, determine if the differential e-Locker actuator is stuck in a position that is not the same as a commanded position, and to generate an output signal that indicates whether the differential e-Locker actuator is stuck in a position that is not the same as the commanded position;
an e-Locker actuator controller configured to command the differential e-Locker actuator to move between the first and second positions in response to e-Locker engage and disengage commands; and
a controller in communication with the e-Locker actuator controller and configured to generate the e-Locker engage and disengage commands.

8. The system of claim 7 wherein the controller is configured to generate the e-locker engage and disengage commands based on signals from a driver e-Lock input selector.

9. The system of claim 7 wherein the differential e-Locker actuator comprises a solenoid valve that actuates between the first and second positions.

10. The system of claim 9 wherein the differential e-Locker actuator further comprises a spring that urges the solenoid valve to the second position when the e-Locker coil is not energized.

11. The system of claim 7 wherein the e-Locker differential is configured to drive rotation of the plurality of wheels at the same rotational speed when the e-locker differential is in the locked state.

12. The system of claim 7 wherein the e-Locker differential is configured to allow rotation of the plurality of wheels at different rotational speeds when the e-locker differential is in the unlocked state.

13. A system for detecting when an electronic locking (e-Locker) differential of a vehicle is in a stuck condition, comprising:
an e-Locker differential configured to drive a plurality of wheels of the vehicle;
a differential e-Locker actuator configured to move between first and second positions, wherein the e-Locker differential is in a locked state when the differential e-Locker actuator is in the first position, and the e-Locker differential is in an unlocked state when the differential e-Locker actuator is in the second position;
an e-Locker coil operably associated with the differential e-Locker actuator and configured to move the differential e-Locker actuator between the first and second positions depending on whether the e-Locker coil is energized,
wherein the e-Locker coil has a first inductance with the differential e-Locker actuator is in the first position and has a second inductance when the differential e-Locker actuator is in the second position, wherein the first inductance is greater than the second inductance;

a sensor configured to sense one of (a) a position of the differential e-locker actuator and (b) an inductance of the e-Locker coil;

a diagnostic subsystem configured to, based on input from the sensor, determine if the differential e-Locker actuator is stuck in a position that is not the same as a commanded position, and to generate an output signal that indicates whether the differential e-Locker actuator is stuck in a position that is not the same as the commanded position; and an e-Locker actuator controller configured to command the differential e-Locker actuator to move between the first and second positions in response to e-Locker engage and disengage commands.

14. A system for detecting when an electronic locking (e-Locker) differential of a vehicle is in a stuck condition, comprising:

an e-Locker differential configured to drive a plurality of wheels of the vehicle;

a differential e-Locker actuator configured to move between first and second positions, wherein the e-Locker differential is in a locked state when the differential e-Locker actuator is in the first position, and the e-Locker differential is in an unlocked state when the differential e-Locker actuator is in the second position;

an e-Locker coil operably associated with the differential e-Locker actuator and configured to move the differential e-Locker actuator between the first and second positions depending on whether the e-Locker coil is energized, wherein the e-Locker coil has a first inductance with the differential e-Locker actuator is in the first position and has a second inductance when the differential e-Locker actuator is in the second position;

a sensor configured to sense a position of the differential e-locker actuator;

a diagnostic subsystem configured to, based on input from the sensor, determine if the differential e-Locker actuator is stuck in a position that is not the same as a commanded position, and to generate an output signal that indicates whether the differential e-Locker actuator is stuck in a position that is not the same as the commanded position; and an e-Locker actuator controller configured to command the differential e-Locker actuator to move between the first and second positions in response to e-Locker engage and disengage commands, wherein:

the sensor comprises a Hall Effect sensor configured to measure the position of the differential e-locker actuator; and the diagnostic subsystem is configured to, based on the position of the differential e-locker actuator, determine if the differential e-Locker actuator is stuck in a position that is not the same as the commanded position.

* * * * *